United States Patent
Kim et al.

(10) Patent No.: US 11,125,128 B2
(45) Date of Patent: Sep. 21, 2021

(54) METHOD OF CONTROLLING REGENERATION OF PARTICULATE FILTER, EXHAUST SYSTEM FOR EXECUTING THE SAME, AND NON-TRANSITORY COMPUTER READABLE RECORDING MEDIA

(71) Applicants: HYUNDAI MOTOR COMPANY, Seoul (KR); KIA MOTORS CORPORATION, Seoul (KR)

(72) Inventors: Minjae Kim, Hwaseong-si (KR); Seung Suk Yoon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/824,092

(22) Filed: Mar. 19, 2020

(65) Prior Publication Data

US 2021/0164371 A1 Jun. 3, 2021

(30) Foreign Application Priority Data

Dec. 2, 2019 (KR) .................... 10-2019-0158365

(51) Int. Cl.
*F01N 11/00* (2006.01)
*F01N 3/027* (2006.01)
*F01N 9/00* (2006.01)

(52) U.S. Cl.
CPC ............. *F01N 3/027* (2013.01); *F01N 9/002* (2013.01); *F01N 11/005* (2013.01); *F01N 2390/00* (2013.01); *F01N 2560/06* (2013.01)

(58) Field of Classification Search
CPC ........ F01N 3/027; F01N 9/002; F01N 11/005; F01N 2560/06; F01N 2390/00
See application file for complete search history.

(56) References Cited

U.S. PATENT DOCUMENTS

| | | | |
|---|---|---|---|
| 8,240,295 B2* | 8/2012 | Yang | F02M 26/15 123/568.19 |
| 2003/0106309 A1* | 6/2003 | Morimoto | F02D 41/024 60/295 |
| 2004/0159099 A1* | 8/2004 | Kuboshima | F02D 41/029 60/297 |
| 2012/0186235 A1* | 7/2012 | Yamamoto | F02D 41/0275 60/274 |
| 2018/0328246 A1* | 11/2018 | Mikami | F02D 41/027 |
| 2019/0024566 A1* | 1/2019 | Nishizawa | F01N 11/002 |

* cited by examiner

*Primary Examiner* — Matthew T Largi (57) ABSTRACT

A method of controlling regeneration of a particulate filter which traps particulate matter contained in an exhaust gas may include: raising, by a controller, a temperature of the exhaust gas to regenerate the particulate filter by burning the trapped particulate matter when an amount of the particulate matter trapped in the particulate filter is greater than or equal to a predetermined amount. Raising the temperature of the exhaust gas may include: raising the temperature of the exhaust gas based on a first temperature difference compensation, and raising the temperature of the exhaust gas based on a second temperature difference compensation. In particular, the first and second temperature difference compensations are calculated based on a target temperature of the exhaust gas at an upstream of the particulate filter and an actual temperature of the exhaust gas at the upstream of the particulate filter.

19 Claims, 8 Drawing Sheets

METHOD OF CONTROLLING REGENERATION OF PARTICULATE FILTER, EXHAUST SYSTEM FOR EXECUTING THE SAME, AND NON-TRANSITORY COMPUTER READABLE RECORDING MEDIA

CROSS-REFERENCE TO RELATED APPLICATION

This application claims priority to and the benefit of Korean Patent Application No. 10-2019-0158365, filed on Dec. 2, 2019, the entire contents of which are incorporated herein by reference.

FIELD

The present disclosure relates to a method of controlling regeneration of a particulate filter and an exhaust system for executing the same, and more particularly, to a method of controlling regeneration of a particulate filter and an exhaust system for executing the same which can inhibit breakage of the particulate filter when the particulate filter is regenerated.

BACKGROUND

The statements in this section merely provide background information related to the present disclosure and may not constitute prior art.

In general, an exhaust gas discharged from an engine through an exhaust manifold is guided to and purified by catalytic converters mounted on the exhaust pipe, and is discharged into the atmosphere through passing a tail pipe after noise is attenuated while the exhaust gas passes through a muffler. The catalytic converters purify contaminants contained in the exhaust gas. In addition, a particulate filter for trapping particulate matter (PM) contained in the exhaust gas is mounted on the exhaust pipe.

As the particulate matter is trapped in the particulate filter, a capacity of the particulate filter for trapping the particulate matter deteriorates. Therefore, the particulate matter trapped in the particulate filter should be periodically removed. In general, the particulate matter is removed by raising a temperature of the exhaust gas and burning the particulate matter trapped in the particulate filter. This is referred to as regeneration of the particulate filter.

Due to tightened exhaust gas regulations, a catalytic converter for removing nitrogen oxide contained in the exhaust gas is mounted at an upstream of the particulate filter. Among these catalytic converters, use of a lean NOx trap (LNT) is increasing. The LNT catalyst absorbs the nitrogen oxide contained in the exhaust gas when operated at a lean air-fuel ratio (AFR), and releases the absorbed nitrogen oxide and reduces the released nitrogen oxide and the nitrogen oxide contained in the exhaust gas using carbon monoxide or hydrocarbon contained in the exhaust gas when operated at a rich AFR. Heat is generated when the LNT catalyst removes the nitrogen oxide at the rich AFR, and the heat is used to raise an internal temperature of the particulate filter at a downstream of the LNT catalyst. If the particulate filter is exposed to high temperature (e.g., 900° C. or higher), the particulate filter may be damaged. It is desired to manage the internal temperature of the particulate filter.

Meanwhile, post-injection is used to raise the temperature of the exhaust gas during the regeneration of the particulate filter. Post-injected fuel amount is determined according to a target temperature of the exhaust gas at an upstream of the particulate filter. In addition, the target temperature of the exhaust gas at the upstream of the particulate filter is set such that the internal temperature of the particulate filter is too high but the regeneration of the particulate filter is completed within a suitable period, and is usually set to increase with time. Even though the same fuel amount is post-injected, an actual temperature of the exhaust gas at the upstream of the particulate filter rises in different patterns depending on a driving condition of the engine, PM amount trapped in the particulate filter, environmental conditions, and the like. Thus, the post-injected fuel amount is corrected according to a difference between the target temperature of the exhaust gas at the upstream of the particulate filter and the actual temperature of the exhaust gas at the upstream of the particulate filter. In particular, the post-injected fuel amount is corrected in consideration of a case where the regeneration of the particulate filter is abnormally performed.

The above information disclosed in this Background section is only for enhancement of understanding of the background of the present disclosure and therefore it may contain information that does not form the prior art that is already known to a person of ordinary skill in the art.

SUMMARY

The present disclosure provides a method of controlling regeneration of a particulate filter and an exhaust system for executing the same having advantages of improving regeneration efficiency while preventing breakage of the particulate filter.

According to an exemplary form of the present disclosure, a method of controlling regeneration of a particulate filter which traps particulate matter contained in an exhaust gas is disclosed. The method of controlling regeneration of the particulate filter may include: raising, by a controller, a temperature of the exhaust gas to regenerate the particulate filter by burning the trapped particulate matter when an amount of the particulate matter trapped in the particulate filter is greater than or equal to a predetermined amount. In particular, raising the temperature of the exhaust gas may include: raising the temperature of the exhaust gas based on a first temperature difference compensation, and raising the temperature of the exhaust gas based on a second temperature difference compensation, wherein the first and second temperature difference compensations are calculated based on a target temperature of the exhaust gas at an upstream of the particulate filter and an actual temperature of the exhaust gas at the upstream of the particulate filter.

In one aspect, the temperature of the exhaust gas is raised based on the first temperature difference compensation when the actual temperature of the exhaust gas at the upstream of the particulate filter is lower than a predetermined temperature, and the temperature of the exhaust gas is raised based on the second temperature difference compensation may be performed when the actual temperature of the exhaust gas at the upstream of the particulate filter is higher than or equal to the predetermined temperature.

In another aspect, the temperature of the exhaust gas is raised based on the first temperature difference compensation when an elapsed time from a point when the regeneration of the particulate filter is started is less than a predetermined time, and the temperature of the exhaust gas is raised based on the second temperature difference compensation when the elapsed time is greater than or equal to the predetermined time.

The first temperature difference compensation may be selected among predetermined temperature difference compensations, and the second temperature difference compensation may be learned. In one form, the second temperature difference compensation is updated based on temperature feedback information from the controller after raising the temperature of the exhaust gas based on the first or second temperature difference compensation.

The first temperature difference compensation may be calculated based on the elapsed time from the point when the regeneration of the particulate filter is started, a predetermined maximum value, and a predetermined minimum value.

The method of controlling regeneration of the particulate filter may further include: calculating a limit setting factor based on the elapsed time; calculating an actual maximum value and an actual minimum value based on the limit setting factor, the predetermined maximum value, and the predetermined minimum value; and selecting a temperature difference compensation between the actual minimum value and the actual maximum value.

The second temperature difference compensation may be calculated based on the actual temperature of the exhaust gas at the upstream of the particulate filter and a time delayed target temperature.

The time delayed target temperature may be calculated based on the target temperature calculated based on a model temperature of the exhaust gas at the upstream of the particulate filter and an exhaust flow rate, and a time delay.

The time delay may be calculated based on the actual temperature of the exhaust gas at the upstream of the particulate filter and the elapsed time from the point when the regeneration of the particulate filter is started.

An exhaust system according to another exemplary form of the present disclosure may include: a particulate filter mounted on an exhaust pipe at a downstream of an engine and configured to trap particulate matter contained in an exhaust gas flowing in the exhaust pipe; and a controller that controls a regeneration of the particulate filter. The controller may control a raising of a temperature of the exhaust gas based on a difference between a target temperature of the exhaust gas at an upstream of the particulate filter and an actual temperature of the exhaust gas at the upstream of the particulate filter. The controller may control the raising of the temperature of the exhaust gas by raising the temperature of the exhaust gas based on a first temperature difference compensation, and a second temperature difference compensation.

In one aspect, the controller may be configured to raise the temperature of the exhaust gas based on the first temperature difference compensation when the actual temperature of the exhaust gas at the upstream of the particulate filter is lower than a predetermined temperature, and raise the temperature of the exhaust gas based on the second temperature difference compensation when the actual temperature of the exhaust gas at the upstream of the particulate filter is higher than or equal to the predetermined temperature.

In another aspect, the controller may be configured to control the raising of the temperature of the exhaust gas based on the first temperature difference compensation when an elapsed time from a point when the regeneration of the particulate filter is started is less than a predetermined time, and control the raising of the temperature of the exhaust gas based on the second temperature difference compensation when the elapsed time is greater than or equal to the predetermined time.

The controller may calculate the first temperature difference compensation based on the elapsed time from the point when the regeneration of the particulate filter is started, a predetermined maximum value, and a predetermined minimum value.

The controller may calculate a limit setting factor based on the elapsed time, calculate an actual maximum value and an actual minimum value based on the limit setting factor, the predetermined maximum value, and the predetermined minimum value, and select a temperature difference compensation between the actual minimum value and the actual maximum value.

The controller may calculate the second temperature difference compensation based on the target temperature calculated based on a model temperature of the exhaust gas at the upstream of the particulate filter and an exhaust flow rate.

The controller may calculate a time delayed target temperature by applying a time delay to the target temperature, and calculate the second temperature difference compensation based on the actual temperature and the time delayed target temperature. In particular, the time delay is calculated based on the actual temperature of the exhaust gas at the upstream of the particulate filter and the elapsed time from the point when the regeneration of the particulate filter is started.

According to other exemplary form of the present disclosure, a non-transitory computer readable recording media is configured to store a set of instructions that when executed by a processor cause the processor to perform a method of controlling regeneration of a particulate filter which traps particulate matter contained in an exhaust gas. The set of instructions may include: instructions for raising a temperature of the exhaust gas to regenerate the particulate filter by burning the trapped particulate matter when an amount of the particulate matter trapped in the particulate filter is greater than or equal to a predetermined amount. In raising the temperature of the exhaust gas, the temperature of the exhaust gas is raised based on a first temperature difference compensation, and a second temperature difference compensation. The first and second temperature difference compensations may be calculated based on a target temperature of the exhaust gas at an upstream of the particulate filter and an actual temperature of the exhaust gas at the upstream of the particulate filter.

In some forms of the present disclosure, the raising the temperature of the exhaust gas based on the first temperature difference compensation is performed when the actual temperature of the exhaust gas at the upstream of the particulate filter is lower than a predetermined temperature or an elapsed time from a point when the regeneration of the particulate filter is started is less than a predetermined time; and raising the temperature of the exhaust gas based on the second temperature difference compensation is performed when the actual temperature of the exhaust gas at the upstream of the particulate filter is higher than or equal to the predetermined temperature or the elapsed time is greater than or equal to the predetermined time.

The first temperature difference compensation may be selected among predetermined temperature difference compensations based on the elapsed time from the point where the regeneration of the particulate filter is started, a predetermined maximum value, and a predetermined minimum value.

The second temperature difference compensation may be calculated based on the target temperature calculated based on a model temperature of the exhaust gas at the upstream of the particulate filter and an exhaust flow rate, and a time delay calculated based on the actual temperature of the exhaust gas at the upstream of the particulate filter and the elapsed time from the point when the regeneration of the particulate filter is started.

According to the exemplary forms of the present disclosure, regeneration efficiency of the particulate filter may be improved while reducing possibilities of damage of the particulate filter due to abnormal regeneration of the particulate filter, by using a suitable temperature difference compensation according to progress of the regeneration of the particulate filter.

Particularly, the first temperature difference compensation is selected among predetermined temperature difference compensations in a region where an internal temperature of the particulate filter rises steeply, and the second temperature difference compensation is learned and the learned second temperature difference compensation is used in a region where the internal temperature of the particulate filter gradually rises. Therefore, the regeneration of the particulate filter may be performed more quickly while further reducing the possibilities of breakage of the particulate filter.

In addition, other effects of the exemplary forms of the present disclosure should be explicitly or implicitly described in the description provided herein. Various effects predicted according to the exemplary forms of the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular forms only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit (e.g., electronic control unit (ECU), transmission control unit (TCU), etc.) or a controller. The term "control unit" or "controller" may refer to a hardware device that includes a memory and a processor. The memory is configured to store program instructions, and the processor is specifically programmed to execute the program instructions to perform one or more processes which are described further below. The control unit or the controller may control operation of units, modules, parts, devices, or the like, as described herein. Moreover, it is understood that the below methods may be executed by an apparatus comprising the control unit or the controller in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 1:
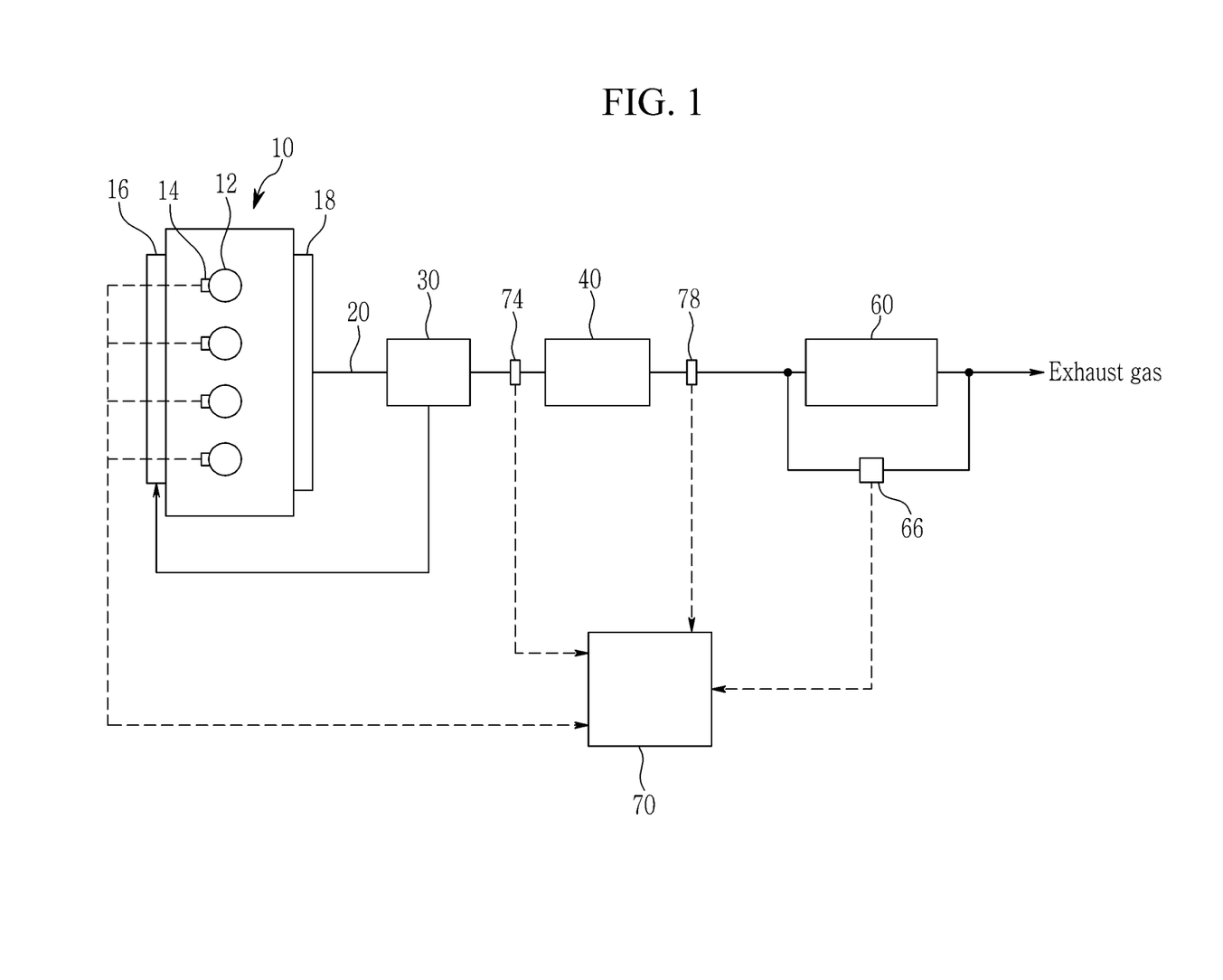
FIG. 1 is a schematic diagram of an exhaust system according to an exemplary form of the present disclosure.

FIG. 1 is a schematic diagram of an exhaust system according to an exemplary form of the present disclosure.

As shown in FIG. 1, an exhaust system of an internal combustion engine includes an engine 10, an exhaust pipe 20, exhaust gas recirculation (EGR) apparatus 30, a lean NOx trap (LNT) catalyst 40, a particulate filter 60, and a controller 70.

The engine 10 burns a mixture of a fuel and an air to convert chemical energy into mechanical energy. The engine 10 is connected to an intake manifold 16 to receive the air into a combustion chamber 12, and an exhaust gas generated in combustion process is gathered in an exhaust manifold 18 and is then discharged to an outside of the engine. An injector 14 is mounted in the combustion chamber 12 to inject the fuel into the combustion chamber 12.

Here, a diesel engine is illustrated, but a type of the internal combustion engine is not limited thereto. For example, a lean-burn gasoline engine may be used. If the gasoline engine is used, the mixture is flowed in the combustion chamber 12 through the intake manifold 16 and a spark plug (not shown) for ignition is mounted at an upper portion of the combustion chamber 12. In addition, if a gasoline direct injection (GDI) engine is used, the injector 14 is mounted at the upper portion of the combustion chamber 12 similar to the diesel engine.

The exhaust pipe 20 is connected to the exhaust manifold 18 to discharge the exhaust gas to an outside of a vehicle. The LNT catalyst 40 and the particulate filter 60 are mounted on the exhaust pipe 20 to remove hydrocarbon, carbon monoxide, particulate matter, and nitrogen oxide contained in the exhaust gas.

The exhaust gas recirculation apparatus 30 is mounted on the exhaust pipe 20 to supply a portion of the exhaust gas exhausted from the engine 10 back into the engine 10 through the exhaust gas recirculation apparatus 30. In addition, the exhaust gas recirculation apparatus 30 is connected to the intake manifold 16 to control a combustion temperature by mixing the portion of the exhaust gas to the air. Such control of the combustion temperature is performed by adjusting an amount of the exhaust gas supplied to the intake manifold 16 by the controller 70. Therefore, an EGR valve (not shown) controlled by the controller 70 may be mounted on a line connecting the exhaust gas recirculation apparatus 30 with the intake manifold 16.

A first temperature sensor 74 is mounted on the exhaust pipe 20 downstream of the exhaust gas recirculation apparatus 30 to detect a temperature of the exhaust gas passing through the exhaust gas recirculation apparatus 30, i.e., the temperature of the exhaust gas at an upstream of the particulate filter 60.

The LNT catalyst 40 is mounted on the exhaust pipe 20 downstream of the exhaust gas recirculation apparatus 30. The LNT catalyst 40 absorbs the nitrogen oxide (NOx) contained in the exhaust gas at a lean AFR, and releases the absorbed nitrogen oxide and reduces the nitrogen oxide contained in the exhaust gas or the released nitrogen oxide at a rich AFR. In addition, the LNT catalyst 40 oxidizes the carbon monoxide (CO) and the hydrocarbon (HC) contained in the exhaust gas.

Herein, it should be understood that the hydrocarbon refer to all compounds consisting of carbon and hydrogen included in the exhaust gas and the fuel.

A second temperature sensor 78 is mounted on the exhaust pipe 20 downstream of the LNT catalyst 40. The second temperature sensor 78 detects the temperature of the exhaust gas flowing into the particulate filter 60 and transmits a signal corresponding thereto to the controller 70.

The particulate filter 60 is mounted on the exhaust pipe 20 downstream of the LNT catalyst 40 and traps the particulate matter contained in the exhaust gas. Typically, the particulate filter 60 includes a plurality of inlet channels and outlet channels. An end of the inlet channel is open and the other end of the inlet channel is closed such that the inlet channel receives the exhaust gas through the end of the inlet channel. In addition, the end of the outlet channel is closed and the other end of the outlet channel is open such that the exhaust gas in the particulate filter 60 is discharged. The exhaust gas flowing into the particulate filter 60 through the inlet channel flows into the outlet channel through a porous wall dividing the inlet channel and the outlet channel, and is then discharged from the particulate filter 60 through the outlet channel. While the exhaust gas passes through the porous wall, the particulate matter contained in the exhaust gas is trapped in the inlet channel.

A pressure difference sensor 66 is mounted on the exhaust pipe 20. The pressure difference sensor 66 detects a pressure difference between the upstream and the downstream of the particulate filter 60 and transmits a signal corresponding thereto to the controller 70. The controller 70 may control to regenerate the particulate filter 60 when the pressure difference detected by the pressure difference sensor 66 is higher than or equal to a predetermined pressure. In this case, the temperature of the exhaust gas is raised by post-injecting the fuel by the injector 14 to burn the particulate matter trapped in the particulate filter 60.

The controller 70 determines a driving condition of the engine based on the signals from the sensors, and controls the AFR based on the driving condition of the engine. For example, the controller 70 may control the AFR to be rich such that the NOx is removed by the LNT catalyst 40. The control of the AFR can be performed by controlling an amount and injection timing of the fuel injected by the injector 14.

In addition, the controller 70 may control the regeneration of the particulate filter 60 based on the pressure difference detected by the pressure difference sensor 66. In this case, the controller 70 raises the temperature of the exhaust gas by post-injecting the fuel by the injector 14.

Meanwhile, a plurality of maps and a plurality of models defining characteristics of the LNT catalyst 40 and the particulate filter 60 is stored in the controller 70, and the controller 70 calculates an amount of the NOx absorbed in the LNT catalyst 40 and controls the AFR of the exhaust gas based on the amount of the NOx absorbed in the LNT catalyst 40. In addition, for controlling the regeneration of the particulate filter 60, a model temperature of the exhaust gas at the upstream of the particulate filter, a target temperature of the exhaust gas at the upstream of the particulate filter, a plurality of predetermined first temperature difference compensations, and a learned value of a second temperature difference compensation may be stored in the controller 70. The plurality of maps, models, and first and second temperature difference compensations may be set by a number of experiments.

To this end, the controller 70 may be implemented with one or more processors executed by a predetermined program and the predetermined program may be programmed to perform each step of a method of controlling regeneration of a particulate filter according to an exemplary form of the present disclosure.

Figure 2:
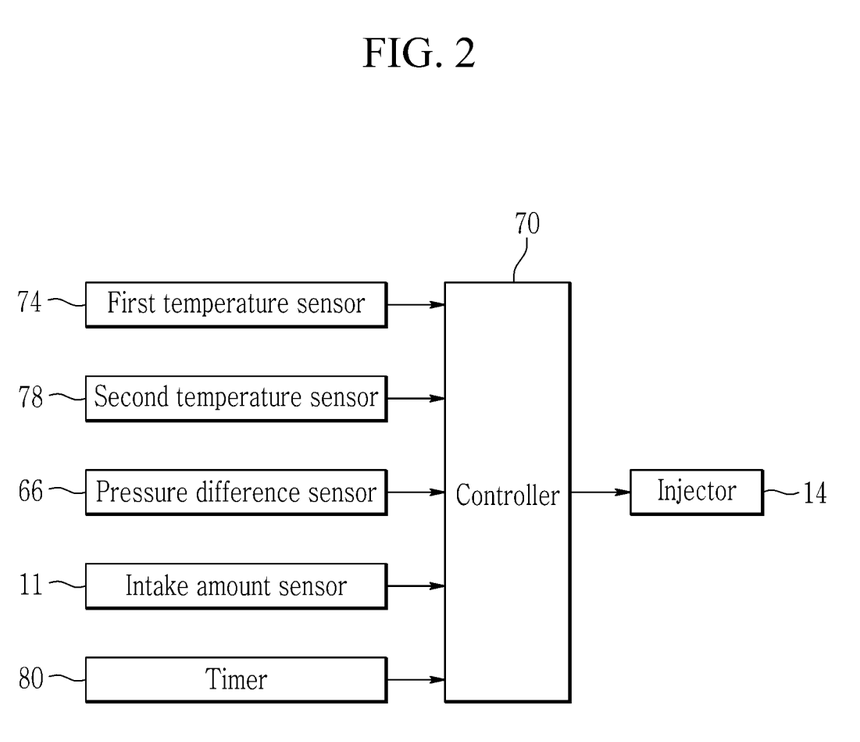
FIG. 2 is a block diagram illustrating inputs and outputs of a controller used in a method of controlling regeneration of a particulate filter according to an exemplary form of the present disclosure.

FIG. 2 is a block diagram illustrating inputs and outputs of a controller used in a method of controlling regeneration of a particulate filter according to an exemplary form of the present disclosure.

As shown in FIG. 2, the first temperature sensor 74, the second temperature sensor 78, the pressure difference sensor 66, an intake amount sensor 11, and a timer 80 are electrically connected to and transmit the detected values to the controller 70.

The first temperature sensor 74 detects the temperature of the exhaust gas flowing into the LNT catalyst 40 and transmits the signal corresponding thereto to the controller 70.

The second temperature sensor 78 detects the temperature of the exhaust gas flowing into the particulate filter 60 and transmits the signal corresponding thereto to the controller 70.

The pressure difference sensor 66 detects the pressure difference between the upstream and the downstream of the particulate filter 60 and transmits the signal corresponding thereto to the controller 70.

The intake amount sensor 11 detects an amount of the intake air supplied to an intake system of the engine 10 and transmits the signal corresponding thereto to the controller 70.

The timer 80 is turned on by the controller 70 at a time when a specific event occurs and is turned off by the controller 70 at a time when the corresponding specific event ends. For example, the timer 80 is turned on at a point when the regeneration of the particulate filter 60 is started and is turned off at a point when the regeneration of the particulate filter 60 ends. Thereby, the timer 80 detects an elapsed time from the point when the regeneration of the particulate filter is started, and transmits the signal corresponding thereto to the controller 70.

The controller 70 determines the driving condition of the engine, the fuel injection amount, the fuel injection timing, the fuel injection pattern, a regeneration timing of the LNT catalyst 40 (by controlling the AFR of the exhaust gas to be rich to release/purify the NOx absorbed in the LNT catalyst 40), and a regeneration timing of the particulate filter 60 based on the transmitted values, and outputs a signal for controlling the injector 14 to the injector 14.

Meanwhile, the exhaust system according to the exemplary form of the present disclosure may be equipped with a plurality of sensors (e.g., oxygen sensors for controlling the AFR of the exhaust gas, NOx sensors for calculating the NOx amount absorbed in the LNT catalyst 40, etc.) other than the sensors illustrated in FIG. 2, detailed description thereof will be omitted for better comprehension and ease of description.

In addition, position of the sensors may be changed as desired, and is not limited to the position shown in FIG. 1.

Figure 3:
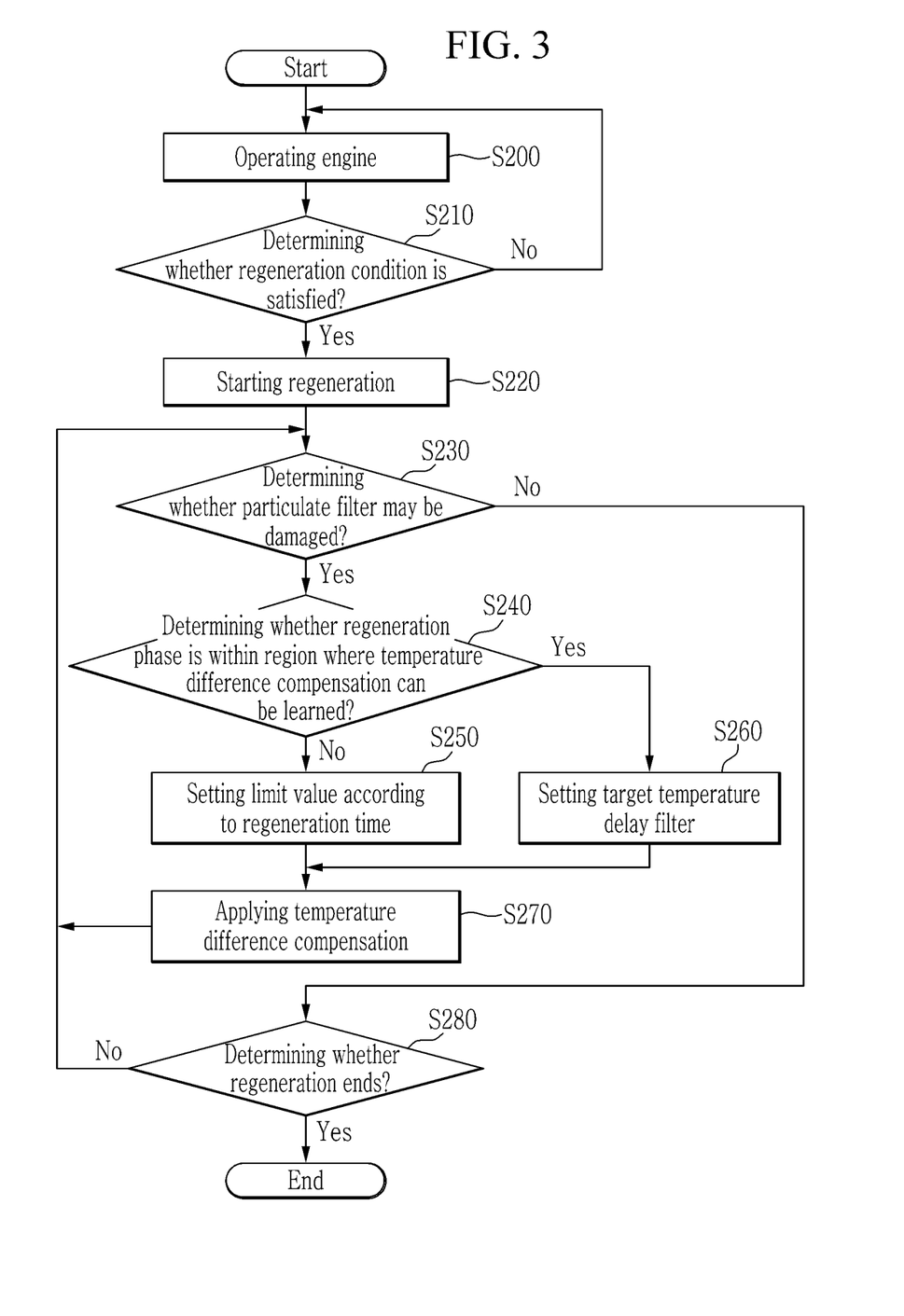
FIG. 3 is a flowchart of a method of controlling regeneration of a particulate filter according to an exemplary form of the present disclosure.

FIG. 3 is a flowchart of a method of controlling regeneration of a particulate filter according to an exemplary form of the present disclosure.

As shown in FIG. 3, when the engine 10 is started and operated at step S200, the controller 70 determines the driving condition of the engine 10 based on the signal transmitted from the plurality of sensors, and controls the engine 10 depending on the determined driving condition. During the engine 10 is operated, the controller 70 determines whether a regeneration condition of the particulate filter 60 is satisfied based on the pressure difference transmitted from the pressure difference sensor 66 at step S210. That is, the controller 70 determines whether the pressure difference is higher than or equal to the predetermined pressure. If the pressure difference is higher than or equal to the predetermined pressure, the regeneration condition of the particulate filter 60 is satisfied. On the contrary, if the pressure difference is lower than the predetermined pressure, the regeneration condition of the particulate filter 60 is not satisfied.

If the regeneration condition of the particulate filter 60 is not satisfied at the step S210, the controller 70 returns to the step S200 and continues to operate the engine 10. If the regeneration condition of the particulate filter 60 is satisfied at the step S210, the controller 70 starts the regeneration of the particulate filter 60 at step S220. For example, the controller 70 raises the internal temperature of the particulate filter 60 by post-injecting the fuel, and therefore the particulate matter trapped in the particulate filter 60 is oxidized.

During the regeneration of the particulate filter 60 is performed, the second temperature sensor 78 detects the temperature of the exhaust gas at the upstream of the particulate filter 60 and transmits the signal corresponding thereto to the controller 70. In addition, the plurality of sensors mounted in the exhaust system transmits the signals corresponding to the detected values (e.g., an engine load, an engine speed, a vehicle speed, an exhaust flow rate, etc.) to the controller 70. The controller 70 determines the driving condition of the engine 10 based on the received signals. In addition, the controller 70 may predict a maximum internal temperature of the particulate filter 60 based on a slope of the temperature of the exhaust gas at the upstream of the particulate filter 60 and the driving condition of the engine 10. The maximum internal temperature of the particulate filter 60 can be set in consideration of a case where the particulate filter 60 is abnormally regenerated.

The controller 70 determines whether the particulate filter 60 may be damaged based on the predicted maximum internal temperature of the particulate filter 60 at step S230. For example, if the maximum internal temperature of the particulate filter 60 is higher than or equal to a limit value (e.g., 900° C. or higher), the controller 70 determines that the particulate filter 60 may be damaged.

If it is determined at the step S230 that the particulate filter 60 may not be damaged, the controller 70 determines whether the regeneration of the particulate filter 60 ends at step S280. If the regeneration of the particulate filter 60 does not end at the step S280, the controller 70 returns to the step S230, continues to regenerate the particulate filter 60, and determines whether the particulate filter 60 may be damaged. If the regeneration of the particulate filter 60 ends at the step S280, the controller 70 ends the method of controlling regeneration of the particulate filter according to the an exemplary form of the present disclosure and continues to operate the engine 10.

If it is determined at the step S230 that the particulate filter 60 may be damaged, on the other hand, the controller 70 determines whether a regeneration phase of the particulate filter 60 is within a region where the temperature difference compensation can be learned at step S240. For example, a difference between an actual temperature of the exhaust gas at the upstream of the particulate filter 60 and a target temperature of the exhaust gas at the upstream of the particulate filter 60 should not change significantly depending on the driving condition of the engine 10, the amount of the particulate matter trapped in the particulate filter 60, the environmental condition (ambient temperature, moisture, etc.), in order to learn the temperature difference compensation. In this case, the temperature difference compensation corresponding to the difference between the actual temperature of the exhaust gas at the upstream of the particulate filter 60 and the target temperature of the exhaust gas at the upstream of the particulate filter 60 can be learned to converge to a specific value or a specific range. If a change in the temperature difference compensation is large according to the driving condition of the engine 10, the amount of the particulate matter trapped in the particulate filter 60, the environmental condition (ambient temperature, moisture, etc.), the learned temperature difference compensation is out of the specific value or the specific range. In this case, if the particulate filter 60 is regenerated using the learned temperature difference compensation, the particulate filter 60 may be damaged since the internal temperature of the particulate filter 60 is too high. Typically, the temperature of the exhaust gas at the upstream of the particulate filter 60 is not sufficiently raised, the learned temperature difference compensation is out of the specific value or the specific range due to a thermal inertia of the exhaust system and the like. On the contrary, if the temperature of the exhaust gas at the upstream of the particulate filter 60 is sufficiently raised, influences of the thermal inertia or other factors of the exhaust system on the temperature of the exhaust gas is reduced, so that the temperature difference compensation can converge to the specific value or the specific range.

In one example, whether the regeneration phase of the particulate filter 60 is within the region where the temperature difference compensation can be learned can be determined based on the actual temperature of the exhaust gas at the upstream of the particulate filter 60. For example, if the actual temperature of the exhaust gas at the upstream of the particulate filter 60 is higher than or equal to a predetermined temperature (e.g., 500° C.), it can be determined that the regeneration phase of the particulate filter 60 is within the region where the temperature difference compensation can be learned. On the contrary, if the actual temperature of the exhaust gas at the upstream of the particulate filter 60 is lower than the predetermined temperature, it can be determined that the regeneration phase of the particulate filter 60 is out of the region where the temperature difference compensation can be learned.

In another example, whether the regeneration phase of the particulate filter 60 is within the region where the temperature difference compensation can be learned can be determined based on the elapsed time from the point when the regeneration of the particulate filter 60 is started (hereinafter, it will be called a 'regeneration time of the particulate filter'). For example, if the regeneration time of the particulate filter 60 is greater than or equal to a predetermined time (e.g., 100 seconds), it can be determined that the regeneration phase of the particulate filter 60 is within the region where the temperature difference compensation can be learned. On the contrary, if the regeneration time of the particulate filter 60 is less than the predetermined time, it can be determined that the regeneration phase of the particulate filter 60 is out of the region where the temperature difference compensation can be learned.

If it is determined at the step S240 that the regeneration phase of the particulate filter 60 is out of the region where the temperature difference compensation can be learned, the controller 70 selects the temperature difference compensation by setting a limit value according to the regeneration time at step S250. If it is determined at the step S240 that the regeneration phase of the particulate filter 60 is within the region where the temperature difference compensation can be learned, the controller 70 calculates the temperature difference compensation by setting a target temperature delay filter at step S260. Here, in order to distinguish between the temperature difference compensation calculated at the step S250 and the temperature difference compensation calculated at the step S260, the temperature difference compensation calculated at the step S250 will be referred to as the first temperature difference compensation and the temperature difference compensation calculated at the step S260 will be referred to as the second temperature difference compensation.

Figure 4:
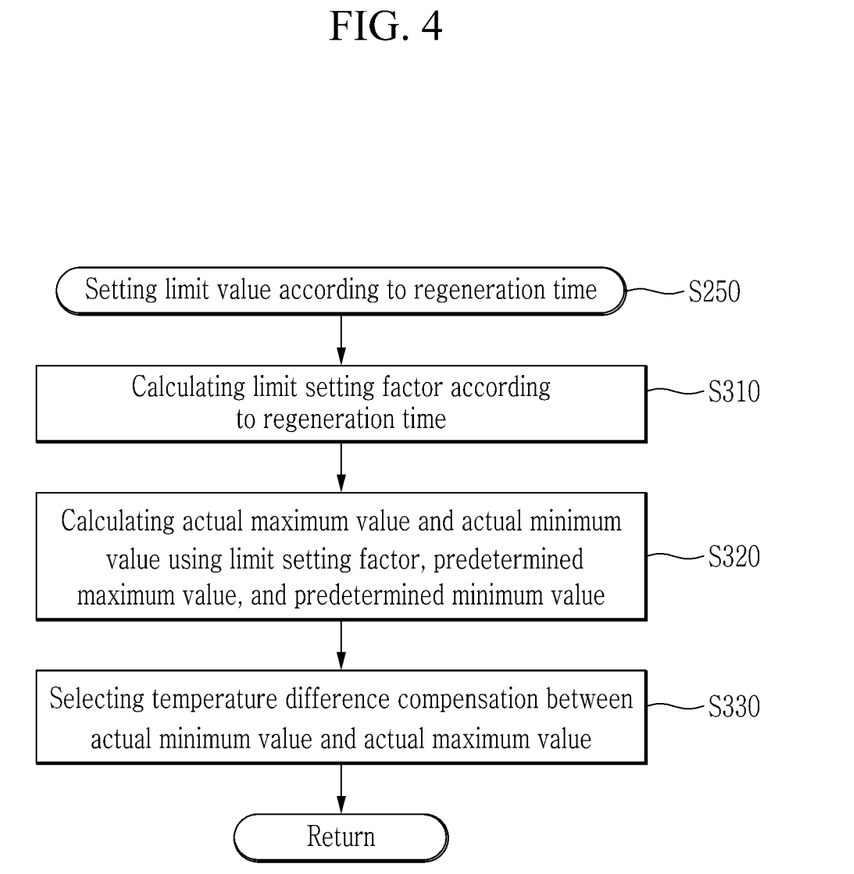
FIG. 4 is a flowchart illustrating a step S250 in FIG. 3 in further detail.
Figure 5:
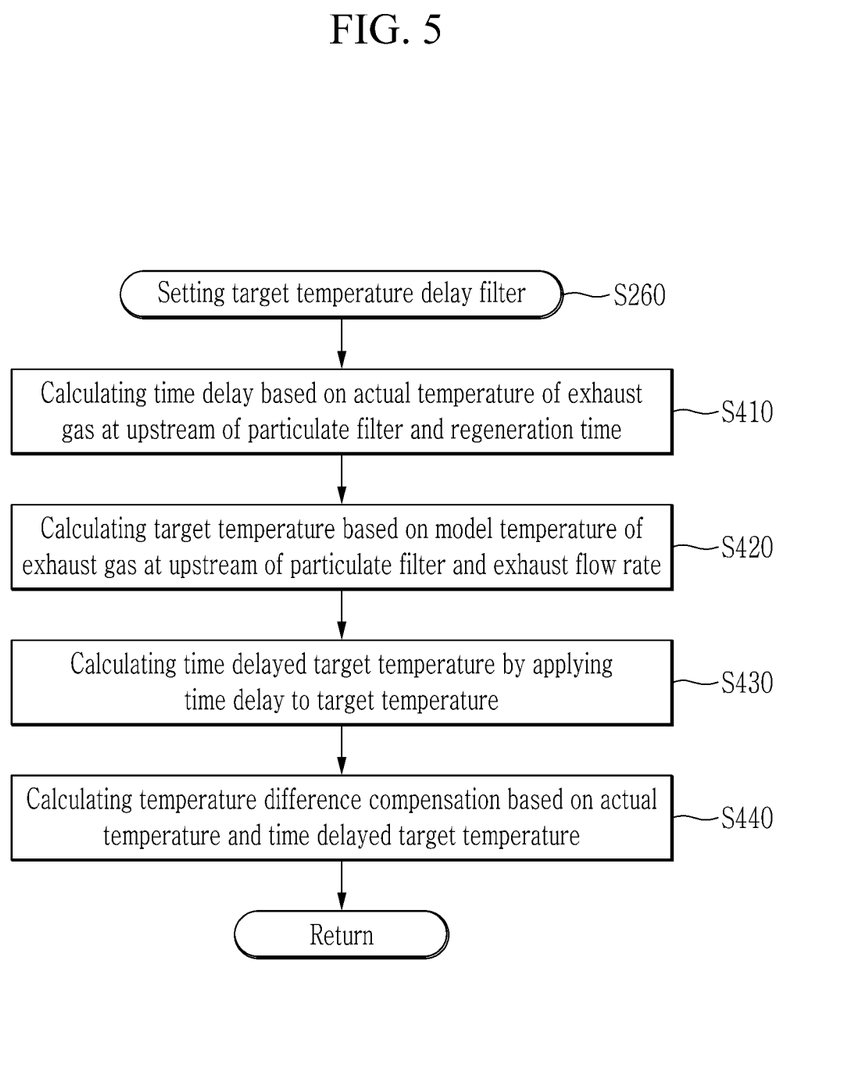
FIG. 5 is a flowchart illustrating a step S260 in FIG. 3 in further detail.

With reference to FIG. 4 and FIG. 5, selection of the first and second temperature difference compensations will be described in detail.

FIG. 4 is a flowchart illustrating a step S250 in FIG. 3 in further detail.

In order to execute the step S250, a maximum value and a minimum value are pre-set in the controller 70 and the plurality of first temperature difference compensations are pre-stored in the controller 70.

When the step S250 is started, the controller 70 calculates a limit setting factor according to the regeneration time by substituting the regeneration time detected by the timer 80 into a predetermined map at step S310. As the regeneration of the particulate filter 60 proceeds, the temperature of the particulate filter 60 rises. Since the first temperature difference compensation is determined depending on the difference between the target temperature of the exhaust gas at the upstream of the particulate filter 60 and the actual temperature of the exhaust gas at the upstream of the particulate filter 60, the first temperature difference compensation should be determined according to the regeneration time until it is determined that the particulate filter 60 may be damaged.

If the limit setting factor according to the regeneration time is calculated, the controller 70 calculates an actual maximum value and an actual minimum value using the limit setting factor, the predetermined maximum value, and the predetermined minimum value at step S320. For example, the controller 70 may calculate the actual maximum value by multiplying the limit setting factor and the predetermined maximum value, and calculate the actual minimum value by multiplying the limit setting factor and the predetermined minimum value.

After that, the controller 70 selects the first temperature difference compensation between the actual minimum value and the actual maximum value at step S330. That is, the controller 70 selects the first temperature difference compensation between the actual minimum value and the actual maximum value among the plurality of predetermined first temperature difference compensations. For example, the controller 70 accumulates the difference between the actual temperature of the exhaust gas at the upstream of the particulate filter 60 and the target temperature of the exhaust gas at the upstream of the particulate filter 60 to calculate a cumulative temperature difference. If the cumulative temperature difference is greater than a predetermined maximum cumulative temperature difference, the controller 70 selects the first temperature difference compensation close to the actual maximum value. On the contrary, if the cumulative temperature difference is lower than a predetermined minimum cumulative temperature difference, the controller 70 selects the first temperature difference compensation close to the actual minimum value.

If the first temperature difference compensation is selected at the step S330, the controller 70 proceeds to step S270.

FIG. 5 is a flowchart illustrating a step S260 in FIG. 3 in further detail.

When the step S260 is started, the controller 70 calculates a time delay by substituting the regeneration time detected by the timer 80 and the actual temperature of the exhaust gas at the upstream of the particulate filter 60 into a predetermined map at step S410. Here, the time delay is a value for delaying a point in time when the target temperature of the exhaust gas at the upstream of the particulate filter 60 is applied. Since the second temperature difference compensation is a learned value, even though the second temperature difference compensation is not suitable (i.e., a case where the internal temperature of the particulate filter 60 becomes higher than the limit value if the second temperature difference compensation is applied), learning of the second temperature difference compensation is not stopped. In this case, the point in time when the target temperature is applied is delayed to manage the internal temperature of the particulate filter 60 below the limit value.

After that, the controller 70 calculates the target temperature of the exhaust gas at the upstream of the particulate filter 60 based on the model temperature of the exhaust gas at the upstream of the particulate filter 60 and an exhaust flow rate at step S420. Here, the exhaust flow rate means an amount of the exhaust gas flowing through the exhaust pipe 20 per hour, and is calculated based on the intake air amount detected by the intake amount sensor 11. In addition, the model temperature of the exhaust gas at the upstream of the particulate filter 60 is used to calculate the temperature of the exhaust gas at a specific position at the upstream of the particulate filter 60. That is, if the second temperature sensor 78 is mounted at the specific position at the upstream of the particulate filter 60, the model temperature of the exhaust gas at the upstream of the particulate filter 60 is the same as the actual temperature of the exhaust gas at the upstream of the particulate filter 60. If the second temperature sensor 78 is not mounted at the specific position at the upstream of the particulate filter 60, the temperature of the exhaust gas detected by the second temperature sensor 78 should be corrected to the temperature of the exhaust gas at the specific position at the upstream of the particulate filter 60. To this end, the model temperature of the exhaust gas at the upstream of the particulate filter 60 is used.

If the target temperature of the exhaust gas at the upstream of the particulate filter 60 is calculated, the controller 70 calculates a time delayed target temperature by applying the time delay to the target temperature at step S430. As described above, since the target temperature of the exhaust gas at the upstream of the particulate filter 60 is calculated based on the driving condition of the engine, the amount of the particulate matter trapped in the particulate filter, the environmental condition, etc., the value learned under all the conditions should be used in order to precisely determine the target temperature of the exhaust gas at the upstream of the particulate filter 60. If the target temperature of the exhaust gas at the upstream of the particulate filter 60 is calculated to be higher than the limit value, the temperature of the particulate filter 60 is prevented from rising higher than the limit value by delaying a point in time when the target temperature is applied to a control method, rather than discarding the learned value related to the target temperature.

After that, the controller 70 calculates the second temperature difference compensation based on the actual temperature and the time delayed target temperature at step S440. For example, the second temperature difference compensation may be a difference between the time delayed target temperature and the actual temperature.

If the second temperature difference compensation is calculated, the controller 70 proceeds to the step S270.

If the first temperature difference compensation is selected at the step S250 or the second temperature difference compensation is calculated at the step S260, the controller 70 applies the first temperature difference compensation or the second temperature difference compensation as the temperature difference compensation at the step S270. For example, the controller 70 may determine a post-injection amount and a post-injection timing for raising the temperature of the exhaust gas by the temperature difference compensation, and control the injector 14 to inject fuel at the post-injection timing by the post-injection amount. When the controller applies the second temperature difference compensation, and the controller monitors and determines if the actual temperature follows the target temperature. If the current temperature follows the target temperature slowly, the controller may increase the second temperature difference compensation and apply it at the next regeneration. For this reason, the second temperature difference compensation may be a learned value.

After that, the controller 70 determines whether the regeneration of the particulate filter 60 ends at step S280. For example, the controller 70 can determine whether the regeneration of the particulate filter 60 ends by determining whether the regeneration time reaches a predetermined time.

If the regeneration of the particulate filter 60 does not end at the step S280, the controller 70 returns to the step S230 to continue the regeneration of the particulate filter 60. If the regeneration of the particulate filter 60 ends at the step S280, the controller 70 repeats the step S200 to the step S280 again while the engine 10 operates.

Figure 6:
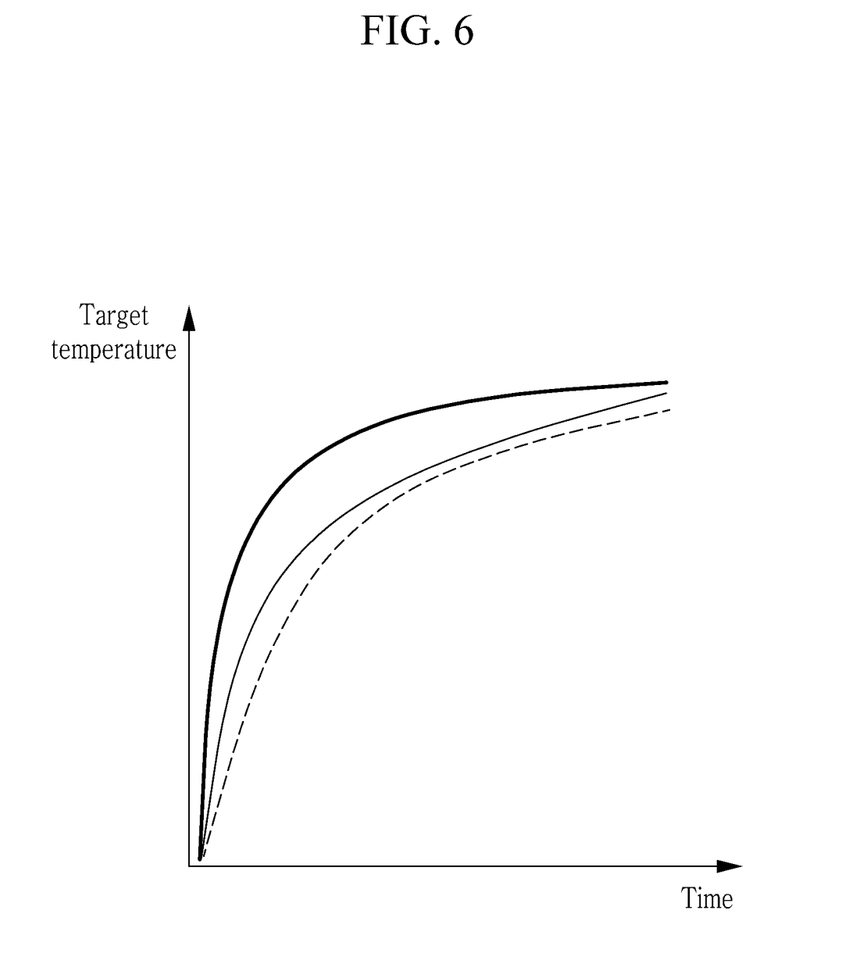
FIG. 6 is a graph showing a target temperature of an exhaust gas at an upstream of a particulate filter over time when a conventional art is performed, a target temperature of an exhaust gas at an upstream of a particulate filter over time when an exemplary form of the present disclosure is performed, and an actual temperature of an exhaust gas at an upstream of the particulate filter over time.
Figure 7:
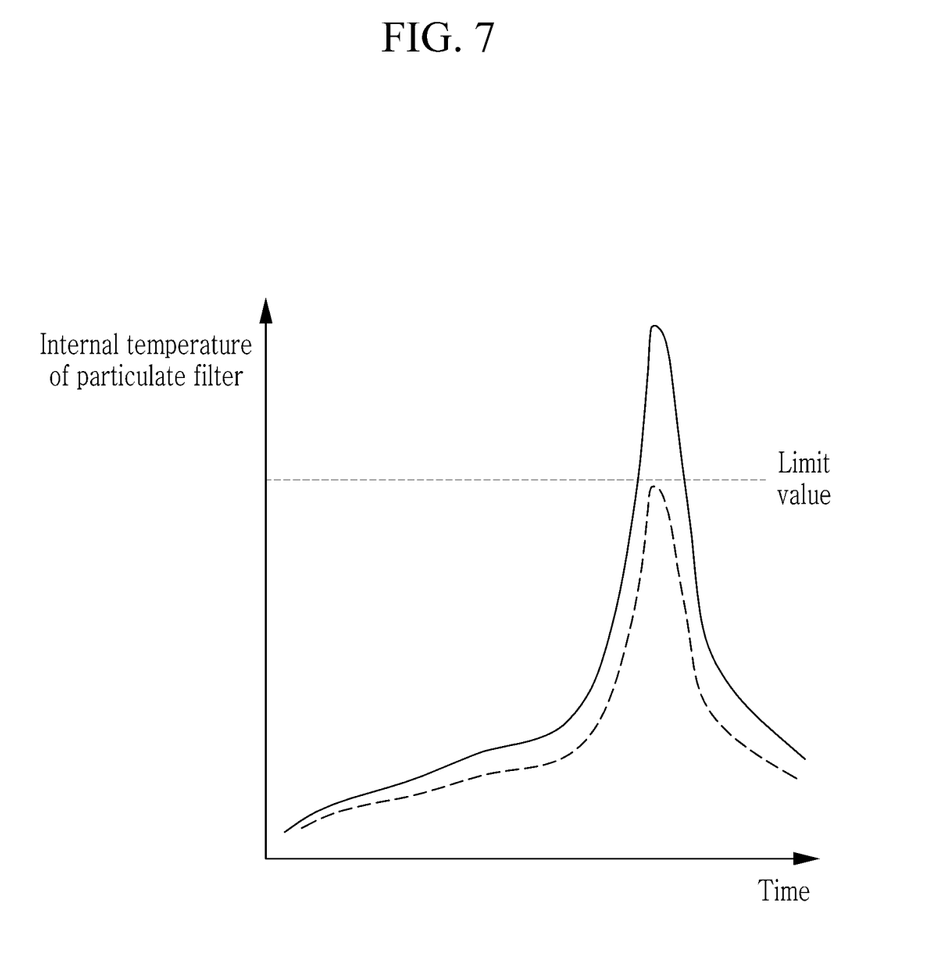
FIG. 7 is a graph showing an internal temperature of a particulate filter over time when a conventional art is performed, and an internal temperature of a particulate filter over time when an exemplary form of the present disclosure is performed.
Figure 8:
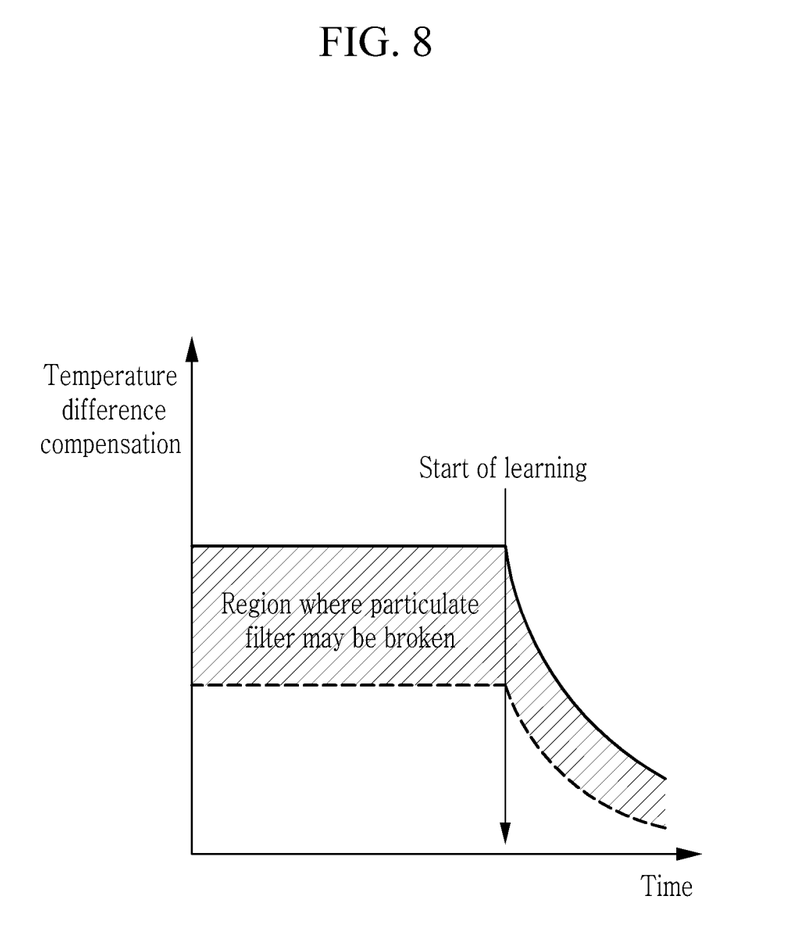
FIG. 8 is a graph showing a temperature difference compensation over time when a conventional art is performed, and a temperature difference compensation over time when an exemplary form of the present disclosure is performed.

FIG. 6 is a graph exemplarily showing the target temperature of the exhaust gas at the upstream of the particulate filter, FIG. 7 is a graph exemplarily showing the internal temperature of particulate filter in regeneration, and FIG. 8 is a graph exemplarily showing the temperature difference compensation used in the regeneration of the particulate filter.

In FIG. 6, a thick solid line represents the target temperature of the exhaust gas at the upstream of the particulate filter 60 over time when a conventional art is executed, a thin solid line represents the target temperature of the exhaust gas at the upstream of the particulate filter 60 over time when the exemplary form of the present disclosure is executed, and a dotted line represents the actual temperature of the exhaust gas at the upstream of the particulate filter 60 over time. In FIG. 7, a solid line represents the internal temperature of the particulate filter 60 over time when a conventional art is executed according to the target temperature illustrated in FIG. 6, and a dotted line represents the internal temperature of the particulate filter 60 over time when the exemplary form of the present disclosure is executed according to the target temperature illustrated in FIG. 6. In FIG. 8, a dotted line represents the temperature difference compensation over time when a conventional art is executed, and a solid line represents the temperature difference compensation over time when the exemplary form of the present disclosure is executed.

Referring to FIG. 6 to FIG. 8, the first temperature difference compensation is not selected between the actual minimum value and the actual maximum value, and the time delay is not applied when the second temperature difference compensation is calculated according to a conventional art. In this case, if abnormal regeneration condition occurs, the maximum internal temperature of the particulate filter 60 is higher than the limit value such that the particulate filter 60 may be damaged. According to an exemplary form of the present disclosure, however, the first temperature difference compensation is selected between the actual minimum value and the actual maximum value, and the time delay is applied when the second temperature difference compensation is calculated. Therefore, even though the abnormal regeneration condition occurs, the maximum internal temperature of the particulate filter 60 can be managed below the limit value.

As shown in FIG. 8, the first temperature difference compensation is selected between the actual minimum value and the actual maximum value, and the time delay is applied when the second temperature difference compensation is calculated according to the exemplary forms of the present disclosure. Therefore, the temperature difference compensation is not calculated in a region where the particulate filter 60 may be broken, thereby lowering the possibility of breakage of the particulate filter 60.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method of controlling regeneration of a particulate filter which traps particulate matter contained in an exhaust gas, the method comprising:
   raising, by a controller, a temperature of the exhaust gas to regenerate the particulate filter by burning the trapped particulate matter when an amount of the particulate matter trapped in the particulate filter is greater than or equal to a predetermined amount,
   wherein raising the temperature of the exhaust gas includes:
   raising the temperature of the exhaust gas based on a first temperature difference compensation, and
   raising the temperature of the exhaust gas based on a second temperature difference compensation, and
   wherein the first and second temperature difference compensations are calculated based on a target temperature of the exhaust gas at an upstream of the particulate filter and an actual temperature of the exhaust gas at the upstream of the particulate filter, and
   wherein:
   the first temperature difference compensation is selected among predetermined temperature difference compensations, and
   the second temperature difference compensation is updated based on temperature feedback information from the controller after raising the temperature of the exhaust gas.

2. The method of claim 1, wherein:
   the temperature of the exhaust gas is raised based on the first temperature difference compensation when the actual temperature of the exhaust gas at the upstream of the particulate filter is lower than a predetermined temperature, and
   the temperature of the exhaust gas is raised based on the second temperature difference compensation when the actual temperature of the exhaust gas at the upstream of the particulate filter is higher than or equal to the predetermined temperature.

3. The method of claim 1, wherein:
   the temperature of the exhaust gas is raised based on the first temperature difference compensation when an elapsed time from a point when the regeneration of the particulate filter is started is less than a predetermined time, and
   the temperature of the exhaust gas is raised based on the second temperature difference compensation when the elapsed time is greater than or equal to the predetermined time.

4. The method of claim 1, wherein the first temperature difference compensation is calculated based on an elapsed time from a point when the regeneration of the particulate filter is started, a predetermined maximum value, and a predetermined minimum value.

5. The method of claim 4, further comprising:
   calculating a limit setting factor based on the elapsed time;
   calculating an actual maximum value and an actual minimum value based on the limit setting factor, the predetermined maximum value, and the predetermined minimum value; and
   selecting the first temperature difference compensation close to the actual minimum value or the actual maximum value between the actual minimum value and the actual maximum value.

6. The method of claim 1, wherein the second temperature difference compensation is calculated based on the actual temperature of the exhaust gas at the upstream of the particulate filter and a time delayed target temperature.

7. The method of claim 6, wherein the time delayed target temperature is calculated based on the target temperature calculated based on a model temperature of the exhaust gas at the upstream of the particulate filter and an exhaust flow rate, and a time delay.

8. The method of claim 7, wherein the time delay is calculated based on the actual temperature of the exhaust gas at the upstream of the particulate filter and an elapsed time from a point when the regeneration of the particulate filter is started.

9. An exhaust system comprising:
   a particulate filter mounted on an exhaust pipe at a downstream of an engine and configured to trap particulate matter contained in an exhaust gas flowing in the exhaust pipe; and
   a controller configured to:
   control a regeneration of the particulate filter,
   control a raising of a temperature of the exhaust gas based on a difference between a target temperature of the exhaust gas at an upstream of the particulate filter and an actual temperature of the exhaust gas at the upstream of the particulate filter,
   wherein the controller is configured to control the raising of the temperature of the exhaust gas by raising the temperature of the exhaust gas based on a first temperature difference compensation and a second temperature difference compensation, and wherein:
the first temperature difference compensation is selected among predetermined temperature difference compensations, and
the second temperature difference compensation is updated based on temperature feedback information from the controller after raising the temperature of the exhaust gas.

10. The exhaust system of claim 9, wherein the controller is configured to:
raise the temperature of the exhaust gas based on the first temperature difference compensation when the actual temperature of the exhaust gas at the upstream of the particulate filter is lower than a predetermined temperature, and
raise the temperature of the exhaust gas based on the second temperature difference compensation when the actual temperature of the exhaust gas at the upstream of the particulate filter is higher than or equal to the predetermined temperature.

11. The exhaust system of claim 9, wherein the controller is configured to:
control the raising of the temperature of the exhaust gas based on the first temperature difference compensation when an elapsed time from a point when the regeneration of the particulate filter is started is less than a predetermined time, and
control the raising of the temperature of the exhaust gas based on the second temperature difference compensation when the elapsed time is greater than or equal to the predetermined time.

12. The exhaust system of claim 9, wherein the controller is configured to calculate the first temperature difference compensation based on an elapsed time from a point when the regeneration of the particulate filter is started, a predetermined maximum value, and a predetermined minimum value.

13. The exhaust system of claim 12, wherein the controller is configured to:
calculate a limit setting factor based on the elapsed time,
calculate an actual maximum value and an actual minimum value based on the limit setting factor, the predetermined maximum value, and the predetermined minimum value, and
select the first temperature difference compensation close to the actual minimum value or the actual maximum value between the actual minimum value and the actual maximum value.

14. The exhaust system of claim 9, wherein the controller is configured to: calculate the second temperature difference compensation based on the target temperature calculated based on a model temperature of the exhaust gas at the upstream of the particulate filter and an exhaust flow rate.

15. The exhaust system of claim 14, wherein:
the controller is configured to:
calculate a time delayed target temperature by applying a time delay to the target temperature, and
calculate the second temperature difference compensation based on the actual temperature and the time delayed target temperature, and
the time delay is calculated based on the actual temperature of the exhaust gas at the upstream of the particulate filter and an elapsed time from a point when the regeneration of the particulate filter is started.

16. A non-transitory computer readable recording media configured to store a set of instructions that when executed by a processor cause the processor to perform a method of controlling regeneration of a particulate filter which traps particulate matter contained in an exhaust gas,
wherein the set of instructions comprise:
instructions for raising a temperature of the exhaust gas to regenerate the particulate filter by burning the trapped particulate matter when an amount of the particulate matter trapped in the particulate filter is greater than or equal to a predetermined amount,
wherein in raising the temperature of the exhaust gas, the temperature of the exhaust gas is raised based on a first temperature difference compensation, and a second temperature difference compensation, where the first and second temperature difference compensations are calculated based on a target temperature of the exhaust gas at an upstream of the particulate filter and an actual temperature of the exhaust gas at the upstream of the particulate filter, and
wherein:
the first temperature difference compensation is selected among predetermined temperature difference compensations, and
the second temperature difference compensation is updated based on temperature feedback information after raising the temperature of the exhaust gas.

17. The non-transitory computer readable recording media of claim 16, wherein:
raising the temperature of the exhaust gas based on the first temperature difference compensation is performed when the actual temperature of the exhaust gas at the upstream of the particulate filter is lower than a predetermined temperature or an elapsed time from a point when the regeneration of the particulate filter is started is less than a predetermined time; and
raising the temperature of the exhaust gas based on the second temperature difference compensation is performed when the actual temperature of the exhaust gas at the upstream of the particulate filter is higher than or equal to the predetermined temperature or the elapsed time is greater than or equal to the predetermined time.

18. The non-transitory computer readable recording media of claim 16, wherein the first temperature difference compensation is selected among predetermined temperature difference compensations based on an elapsed time from a point where the regeneration of the particulate filter is started, a predetermined maximum value, and a predetermined minimum value.

19. The non-transitory computer readable recording media of claim 16, wherein the second temperature difference compensation is calculated based on the target temperature calculated based on a model temperature of the exhaust gas at the upstream of the particulate filter and an exhaust flow rate, and a time delay calculated based on the actual temperature of the exhaust gas at the upstream of the particulate filter and an elapsed time from a point when the regeneration of the particulate filter is started.

* * * * *